July 8, 1969 J. C. STILES ET AL 3,453,894
BIMETAL HEATER FOR A GYROSCOPE
Filed March 2, 1967

INVENTORS
JOHN C. STILES
JOHN F. EMERSON
BY
Constantine A. Michalos
ATTORNEY

United States Patent Office 3,453,894
Patented July 8, 1969

3,453,894
BIMETAL HEATER FOR A GYROSCOPE
John C. Stiles, Mountain Lakes, and John F. Emerson, Hackensack, N.J., assignors to Singer-General Precision, Inc., Little Falls, N.J., a corporation of Delaware
Filed Mar. 2, 1967, Ser. No. 619,979
Int. Cl. G01c 19/02, 19/38; F28f 7/00
U.S. Cl. 74—5                                          7 Claims

ABSTRACT OF THE DISCLOSURE

A variable thermal impedance heater for a free rotor flexure-suspended gyro, having a plurality of bimetallic prestressed snap-action strips or fingers, whereby when they are cold, the fingers are contracted, and when they are heated by the heaters, the fingers extend for physically contacting the rotor; and through said fingers, warm up the rotor by conduction and thereby reduce the necessary warm-up period for the gyro. More specifically, the bimetallic fingers are arranged so that they are within the housing of the rotor and the heater is outside the housing, in thermal contact with the fingers, whereby, when the heater is turned on, the strips or fingers snap towards the rotor and physically contact the rotor to allow heat to flow by conduction, from the heater to the rotor, through the fingers and when the rotor is sufficiently warm, the heater is then turned off and the strips, or fingers, cooled off and retract, allowing now the rotor to rotate freely for its start.

BACKGROUND OF THE INVENTION

Field of the invention

The present invention relates generally to means of shortening the warm-up time needed to warm a gyro rotor and more particularly to a heater for providing heat to a gyro rotor within a partially evacuated support housing or case, and in which, therefore, it is necessary to present a heat flow through the partial vacuum by means of conduction.

Description of the prior art

Heretofore, there was the problem of quickly heating a gyroscope rotor from a cold start when the rotor was enclosed in a gyro support housing or case which was in a state of partial or complete vacuum, and in addition, there was the problem of stabilizing the rotor temperature for preventing improper operation due to changes in the environmental temperature. It will be apparent that in the absence of gas, the only way heat could flow into the rotor from the case is through radiation or conduction through the relatively thin cross-sections of the flexure joints, used by free rotor flexure-suspended gyros. The high thermal impedance of the vacuum, and the typical thin flexure point combined with the massive rotor produced an excessively long thermal time constant. The need for operating the gyro rotor in a partial or complete vacuum, in order to avoid certain error torques which any residual gas may exert upon the rotor, presented the problem of stabilizing the rotor temperature from a cold start.

SUMMARY OF THE INVENTION

Therefore, the present invention provides for a means of changing the thermal impedance between an external heater and an internal gyro rotor in a partial or complete vacuum during the warm-up time. By presenting a means of extending a plurality of internal fingers against the rotor, and actually physically touching the rotor, heat can be directed from the external heater to the internal rotor by means of conduction, and without the need of electrical connection to the interior of the support housing of the gyro rotor.

Therefore, an object of this invention is to provide a means for improving the warm-up characteristics of free rotor flexure suspended gyros such as those described and claimed in the U.S. patent application No. 484,648, by Walter J. Krupick and Richard F. Cimera, assigned to the same assignee as the present invention.

An additional object of this invention is to provide a means for quickly heating a gyro rotor in a partial or in a complete vacuum.

A further object of this invention is to provide a means of heating a gyro rotor by use of a higher rate of conduction through thermal conducting fingers rather than through radiation and through conduction by thin cross-sectional areas of the flexure joints of a hereinbefore mentioned gyro.

Another object of this invention is to provide a means of heating a gyro rotor, whereby the connection of the heating elements from the heater to the rotor are without actual electrical connections to the interior of the gyro.

Still another object of this invention is to provide for a variable impedance heater means having a heater outside a support housing of a gyro rotor with actuating elements within the housing in thermal contacting relation with the heater for extending onto the rotor for heating it by conduction. The elements can then be retracted, and thereby greatly increase the thermal impedance between the rotor and housing so that the rotor is insensitive to fluctuations of the temperature in its environment.

Other objects and many additional advantages will be more readily understood by those skilled in the art after a detailed consideration of the following specification taken with the accompanying drawings.

DESCRIPTION OF THE PREFERRED EMBODIMENT

Figure 1:
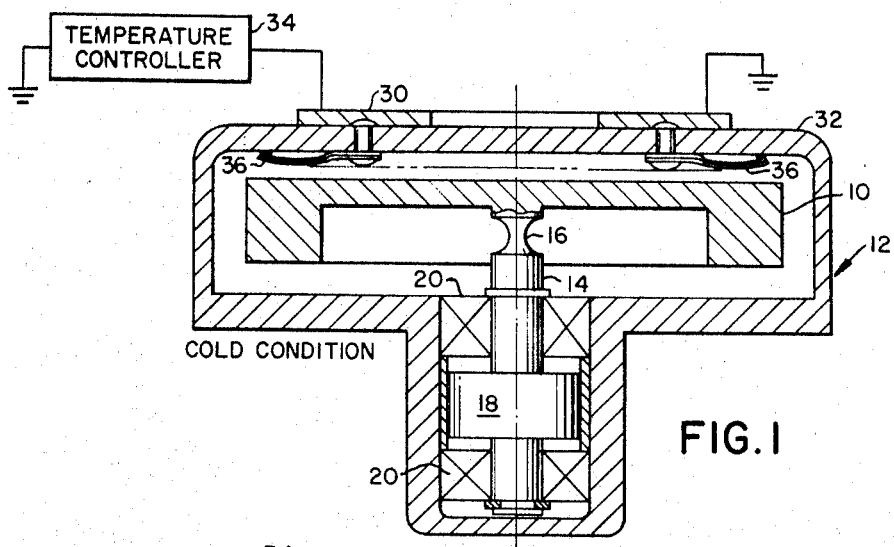
FIGURE 1 is a side sectional view showing a detail rotor and support housing combination of a gyroscope in one position of its operation and in a preferred embodiment of this invention.

Referring to the drawing of this invention, there is shown a gyro rotor 10 of the flexure suspended type such as the Krupick et al. gyro hereinbefore outlined, having a support housing or case 12. It is desirable to operate the gyro rotor 10 in a partial or complete vacuum in order to avoid certain error torques that any residual gas may exert upon the rotor. The gyro rotor 10 is suspended by a shaft 14, and a frictionless gimbal-hinge assembly or flexure joint 16, which interconnects shaft 14 to rotor 10, forming a universal-joint therebetween. There is also a drive means 18, which is operably connected to the shaft 14 for rotating the rotor 10. The drive means 18 and shaft 14 are in turn supported by bearings 20 for spinning about a spin axis 24 within the case 12.

Figure 2:
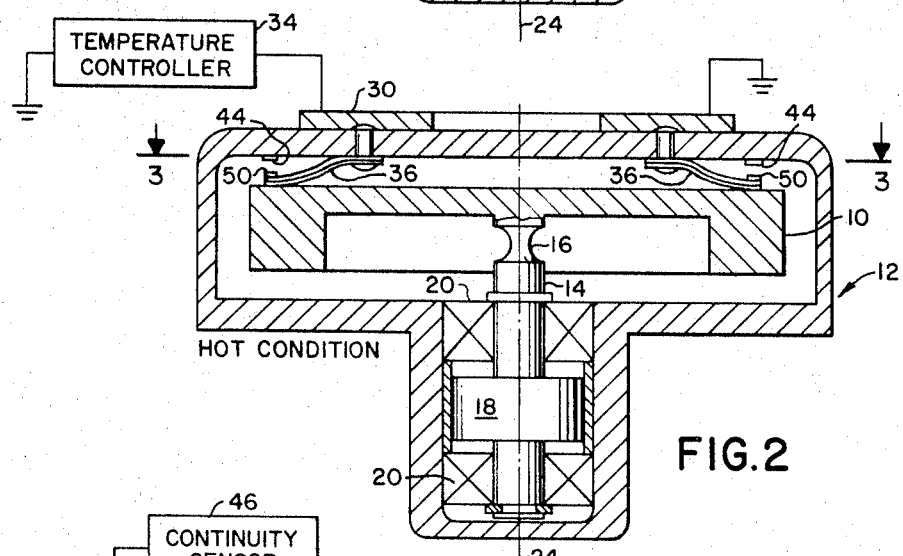
FIGURE 2 is a side sectional view of the invention in accordance with the embodiment of FIGURE 1, in a second position of its operation.

The mechanism utilized for heating the rotor 10 includes an external heater 30 attached to a cover cap member 32 of the case 12 of the gyroscope. The heater may be controlled by a temperature control means 34 which may have a thermostat or other suitable temperature control. In addition, the mechanism includes a number of bimetallic strips or fingers 36 which are attached to the inside of the cap 32 of the case 12, opposite the heater 30. In the normal cold condition, shown in FIGURE 1, these bimetallic strips 36 retract themselves against the gyro cap 32 of the case 12. However, the strips 36 are designed so that when hot, they bend downwardly to touch the gyro rotor 10, as best shown in FIGURE 2. Simply, this system is arranged so that whenever the heater 30 is turned on, the strips 36 bend towards the rotor 10 to physically touch the rotor 10 and heat it by conduction and when it is decided that the rotor 10 is sufficiently warm, the heater 30 is turned off and the strips or fingers 36 cooled off and retract, as shown in FIGURE 1, allowing the rotor to rotate freely. It will be understood that when the bimetallic fingers 36 are in contact with the rotor 10 as shown in FIGURE 2, the drive means 18 is de-energized and the rotor is not rotating. Only after heater 30 is turned off and the fingers have retracted to their position shown in FIGURE 1 is the drive means energized causing the rotor to spin freely about axis 24.

As brought out before, the problem in quickly heating the rotor from a cold start can be solved by use of the extending fingers. At the same time, the rotor is isolated from the external environmental temperature since in the absence of gas, the only way heat can flow to the rotor is through radiation and/or by conduction through the relatively thin cross section area of the flexure joint 16. The high thermal impedance of the flexure joint 16, combined with the massive rotor 10, may produce an excessively long thermal time constant which problem is solved by the plurality of fingers 36. On the other hand, it should be noted that when the fingers 36 are retracted, the gyro rotor 10 in the partial or complete vacuum of the case 12 is substantially isolated from any heat changes.

Figure 4:
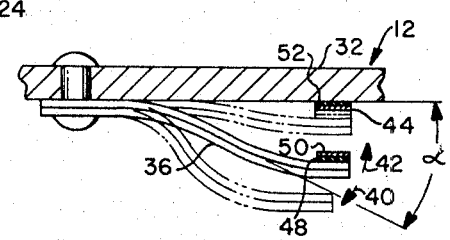
FIGURE 4 is an enlargement of one element of the invention showing a detailed subject matter.

As more specifically shown in FIGURE 4, the fingers 36 are designed so that they engage and disengage the rotor 10 in a positive snap-action manner thereby lessening the danger of starting the rotor 10 while some of the fingers 36 are still very close to the rotor surface. This is accomplished by prestressing the fingers 36 in a manner of a snap-action thermostat so that the fingers are stable in either the up or down condition as viewed in FIGURE 4. An angle of α is shown in FIGURE 4, at which position the fingers 36 are at the point of instability. A small increase of temperature will cause the fingers 36 to snap down, as shown by arrow 40, while a cooling of the fingers, as they are located at the unstable point of angle α will cause the fingers 36 to snap up away from the rotor 10 as shown by the arrow 42.

Figure 3:
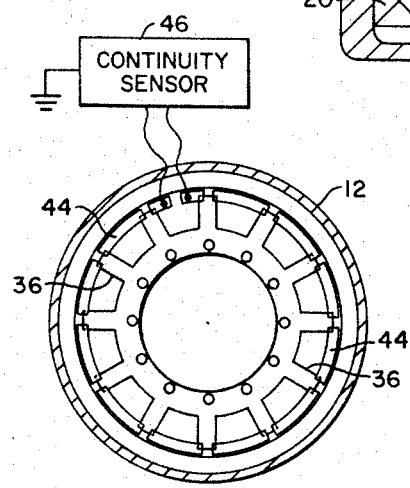
FIGURE 3 is a plan sectional view taken along lines 3—3 of FIGURE 2, showing an element of the invention in detail.

It is sometimes desirable that a positive electrical indication that the fingers are disengaged from the rotor should be provided. This can be accomplished by mounting a plurality of electrical contacts 44, as best shown in FIGURE 3, on the inside of the cover cap 32 of the housing 12. These contacts 44 are arranged so that the electrical continuity occurs only when all of the fingers 36 are retracted to the normal cold position. Once all the fingers 36 are in a contracted position, a continuity sensor 46 will indicate that the rotor 10 is now free to rotate. The fingers 36 may be stamped out from a single plate in which respect they must each be insulated by insulators 48 and have contacts 50 for contacting the contacts 44 of the cap 32 of the housing 12. The contacts 44 must also be insulated from the cap 32 of the housing 12 by insulators 52 for the proper electrical operation of the system.

In summary therefore, it can be seen that with the use of this invention, a much higher rate of heat can be applied to the rotor 10 through thermal conduction by the fingers 36, than through radiation and through conduction by the hereinbefore means of the thin central hinge assembly. As shown, no electrical connections are required to the interior of the gyro, and once the thermal strips or fingers 36 are retracted, the thermal impedance between the rotor and case is greatly increased so the rotor is insensitive to fluctuations of the environmental temperature.

It will be apparent that the thermal fingers 36 can be located at any convenient place within the gyro housing 12. Specifically, it may be advantageous to locate them in opposing pairs so that no net mechanical force can be applied to the rotor 10. That is, in applying the fingers at the lower part of the rotor 10, opposite to fingers 36, the upper fingers 36 and the lower fingers can control the stability of the gyro rotor 10 and thereby heat may be applied to the rotor in a more equal basis. It should be noted that the fingers can be located around the inside circumference of the housing with the heaters encircling the outside of the housing so that when the fingers extend radially inwardly, they physically contact the circumference of the rotor and heat it as hereinbefore described. In this manner, the fingers will contact the rotor without putting any strain on the flexure joints.

While the present invention has been described in a preferred embodiment, it will be obvious to those skilled in the art that various modifications can be made therein within the scope of the invention, and it is intended that the appended claims cover all such modifications.

What is claimed is:

1. A variable thermal impedance heater for a gyro rotor supported within a support housing comprising a plurality of extendable elements supported within said support housing of said rotor; a heater supported outside said support housing of said rotor and in thermal contacting relation to said fingers; said fingers operably extendable for physically contacting said rotor when said heater heats said fingers and thereby heating said rotor by conduction, and operably retractable for releasing said rotor when said rotor is heated to a predetermined temperature.

2. The structure of claim 1, wherein said fingers are made of a thermostatic bimetallic material whereby when said fingers are heated, they operably extend to physically contact said rotor and when said fingers are cooled, are operably retracted to permit said rotor to operate.

3. The structure of claim 1, wherein said fingers are made of a bimetallic material operably extendable when heated by said heater and retractable when cooled, further comprising a temperature control means for controlling the heat of said heater in heating said fingers for extension within said housing and thereby physically contacting said rotor, and upon reaching a predetermined temperature operably shutting off, and thereby permitting said fingers to cool and retract, releasing said rotor for its operation.

4. The structure of claim 3, further comprising a means for positive indication that said fingers are disengaged from said rotor.

5. The structure of claim 4, wherein said support housing includes a circular cover cap and said indicating means comprises a plurality of contacts around the circumference of said cap and in separable position whereby when each of said fingers retract, each finger operably contacts two of said contacts and produces thereby, an electrical continuity; and wherein when all of said fingers are retracted, there will be a signal showing a complete retraction of all the fingers, and thus providing a positive indication that the fingers are disengaged from the rotor, and the rotor can operate.

6. The structure of claim 1, wherein said support housing includes a cover cap and said heater is outside said cover cap, supported by said cap, and said plurality of fingers are inside the cover cap supported by said cap, in thermal contacting relation to said heater, said cap having a first plurality of contacts around its periphery and operable so that two adjacent contacts are in contacting relation with one of said fingers when said finger is in a retracted position; insulation means interposed between each of said fingers and said cap operably insulating each individual contact from the other of the contacts; second plurality of contacts supported at said end of said fingers; insulating means interposed between said second contacts and said fingers, insulating said contacts from said fingers; continuity sensor means connected to two adjacent contacts whereby when each of the individual fingers is retracted, connects one pair of contacts supported on said cap and when all said fingers are retracted to their retracted position, a continuous conductor is formed for directing electrical signals to said continuity sensor and thereby designating that all of said fingers are in a retracted position and said rotor is in its operating position.

7. The structure of claim 6, wherein each of said fingers are made of a prestressed material for producing a snap-action in said fingers in extending to their hot position upon said fingers being heated a small amount beyond a predetermined extending position, and producing a snap-action in said fingers in retracting to their cold position upon said fingers being cooled a small amount beyond a predetermined retracting position and thereby indicating a positive means of engaging and disengaging said rotor by said fingers.

References Cited
UNITED STATES PATENTS 3,177,933  4/1965  Webb _____ 165—96
3,225,820  12/1965  Riordan _____ 165—26

ROBERT A. O'LEARY, *Primary Examiner.*

W. E. WAYNER, *Assistant Examiner.*

U.S. Cl. X.R.

33—226; 165—185